United States Patent [19]

Sage et al.

[11] Patent Number: 5,820,786
[45] Date of Patent: Oct. 13, 1998

[54] FERROELECTRIC LIQUID CRYSTAL DEVICES

[75] Inventors: Ian C Sage; Damien G McDonnell; John C Jones; Andrew Slaney, all of Malvern, Great Britain

[73] Assignee: The Secretary of State for Defence in her Brittanic Majesty's Government of the United Kingdom of Great Britain and Northern Ireland of Defence Evaluation and Research Agency, United Kingdom

[21] Appl. No.: 656,303

[22] PCT Filed: Dec. 9, 1994

[86] PCT No.: PCT/GB94/02693

§ 371 Date: Jun. 18, 1996

§ 102(e) Date: Jun. 18, 1996

[87] PCT Pub. No.: WO95/16760

PCT Pub. Date: Jun. 22, 1995

[30] Foreign Application Priority Data

Dec. 13, 1993 [GB] United Kingdom .................. 9325438

[51] Int. Cl.⁶ .......................... C09K 19/12; C09K 19/34; C09K 19/32; G02F 1/13
[52] U.S. Cl. .............................. 252/299.66; 252/299.61; 252/299.62; 252/299.63; 252/299.65
[58] Field of Search .................. 252/299.61, 299.65, 252/299.66, 299.62, 299.63; 349/149

[56] References Cited

U.S. PATENT DOCUMENTS

| | | | |
|---|---|---|---|
| 5,147,577 | 9/1992 | Gray et al. | 252/299.62 |
| 5,384,071 | 1/1995 | Gray et al. | 252/299.63 |
| 5,456,859 | 10/1995 | Gray et al. | 252/299.63 |
| 5,486,309 | 1/1996 | Gray et al. | 252/299.6 |
| 5,501,818 | 3/1996 | Shinjo et al. | 252/299.61 |
| 5,512,208 | 4/1996 | Terada et al. | 252/299.6 |
| 5,514,297 | 5/1996 | Shinjo et al. | 252/299.61 |
| 5,599,479 | 2/1997 | Shinjo et al. | 252/299.61 |
| 5,611,957 | 3/1997 | McDonnell et al. | 252/299.01 |

*Primary Examiner*—C. H. Kelly
*Attorney, Agent, or Firm*—Nixon & Vanderhye

[57] ABSTRACT

Ferroelectric liquid crystal devices are described which contain liquid crystal mixtures comprising components A and B. Component A consists of one or more optically active compounds capable of imparting a spontaneous polarization to the material. Component B is selected as one or more compounds having formula (I), wherein a, b and c are independently 0, 1, 2; $R_1$ and $R_2$ are $C_{1-15}$ straight or branched chain alkyl or alkoxy, preferably $C_{3-12}$. In the above (for component B) CH=CH linking groups may be replaced by $C_2H_4$ and $CH_2O$ linking groups may be replaced by $OCH_2$.

21 Claims, 3 Drawing Sheets

FERROELECTRIC LIQUID CRYSTAL DEVICES

FERROELECTRIC LIQUID CRYSTAL DEVICES

This application is a 35 USC371 of PCT/GB94/02693 filed Dec. 9, 1994, published as WO95/16760 Jun. 22, 1995.

This invention relates to ferroelectric liquid crystal devices and ferroelectric liquid crystal mixtures. Liquid crystal devices commonly comprise a thin layer of a liquid crystal material contained between two glass slides. Optically transparent electrodes are formed on the inner surface of both slides. When an electric voltage is applied to these electrodes the resulting electric field changes the molecular alignment of the liquid crystal molecules. The changes in molecular alignment are readily observable and form the basis for many types of liquid crystal device.

In ferroelectric liquid crystal devices the molecules switch between different alignment directions depending on the polarity of an applied electric field. These devices often exhibit bistability where the molecules tend to remain in one of two states until switched to the other switched state. This allows the multiplex addressing of quite large and complex devices.

One common multiplex display has display elements. ie pixels, arranged in an x, y matrix format for the display of eg, alpha numeric characters. The matrix format is provided by forming the electrodes on one slide as a series of column electrodes, and the electrodes on the other slide as a series of row electrodes. The intersections between each column and row form addressable elements or pixels. Other matrix layouts are known, eg seven bar numeric displays.

There are many different multiplex addressing schemes. A common feature involves the application of a voltage, called a strobe voltage to each row or line in sequence. Coincidentally with the strobe applied at each row, appropriate voltages, called data voltages, are applied to all column electrodes. The differences between the different schemes lies in the shape of the strobe and data voltage waveforms.

Other addressing schemes are described in GB-2,146,473-A; GB-2,173,336-A; GB-2,173,337-A: GB-2,173,629-A; Wo 89/05025; Harada et al 1985 S.I.D. Paper 8.4 pp 131–134; Lagerwall et al 1985 I.D.R.C pp 213–221 and P Maltese et al in Proc 1988 IDRC p 90–101 Fast Addressing for Ferro Electric LC Display Panels.

The material may be switched between its two states by two strobe pulses of opposite sign, in conjunction with a data waveform. Alternatively, a blanking pulse may be used to switch the material into one of its states. Periodically the sign of the blanking and the strobe pulses may be alternated to maintain a net d.c. value.

These blanking pulses are normally greater in amplitude and length of application than the strobe pulses so that the material switches irrespective of which of the two data waveforms is applied to any one intersection. Blanking pulses may be applied on a line by line basis ahead of the strobe, or the whole display may be blanked at one time, or a group of lines may be simultaneously blanked.

It is well known in the field of ferroelectric liquid crystal device technology that in order to achieve the highest performance from devices, it is important to use mixtures of compounds which give materials possessing the most suitable ferroelectric smectic characteristics for particular types of device.

Devices can be assessed for speed by consideration of the response time vs pulse voltage curve. This relationship may show a minimum in the switching time ($t_{min}$) at a particular applied voltage ($V_{min}$). At voltages higher or lower than $V_{min}$ the switching time is longer than $t_{min}$. It is well understood that devices having such a minimum in their response time vs voltage curve can be multiplex driven at high duty ratio with higher contrast than other ferroelectric liquid crystal devices. It is preferred that the said minimum in the response time vs voltage curve should occur at low applied voltage and at short pulse length respectively to allow the device to be driven using a low voltage source and fast frame address refresh rate.

Typical known materials (where materials are a mixture of compounds having suitable liquid crystal characteristics) which do not allow such a minimum when included in a ferroelectric device include the commercially available materials known as SCE13 and ZLI-3654 (both supplied by Merck UK Ltd. Poole, Dorset). A device which does show such a minimum may be constructed according to PCT GB 88/01004 and utilising materials such as eg commercially available SCE8 (Merck UK Ltd.). Other examples of prior art materials are exemplified by PCT/GB/86/00040, PCT/GB87/00441 and UK 2232416B.

It is the aim of this invention to provide devices having a shorter switching time and/or a lower voltage than previously achieved.

According to this invention a ferroelectric liquid crystal device (eg multiplex addressed) comprises two spaced cell walls each bearing electrode structures and treated on at least one facing surface with an alignment layer, a layer of a smectic liquid crystal material enclosed between the cell walls, a minimum in its response time versus voltage curve, characterised in that the liquid crystal material comprising two components; A and B, where the two components are given by:

Component A being present in the range of 0.1–50 wt % and is one or more optically active compounds capable of imparting a spontaneous polarisation to the material.

Component B is present in the range sufficient to enable A+B=100 wt %, and is at least two compounds selected from:

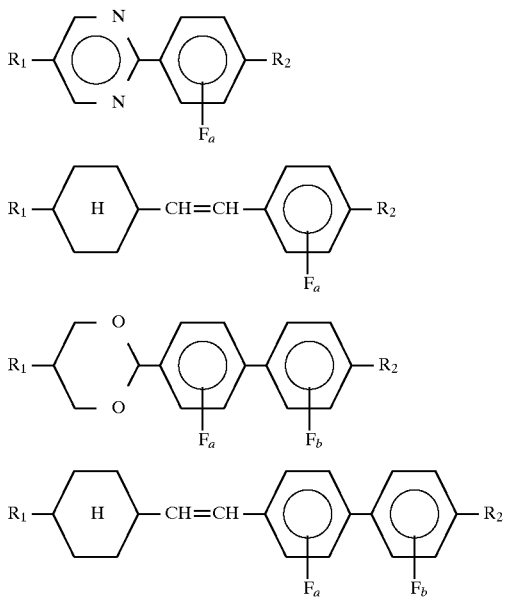

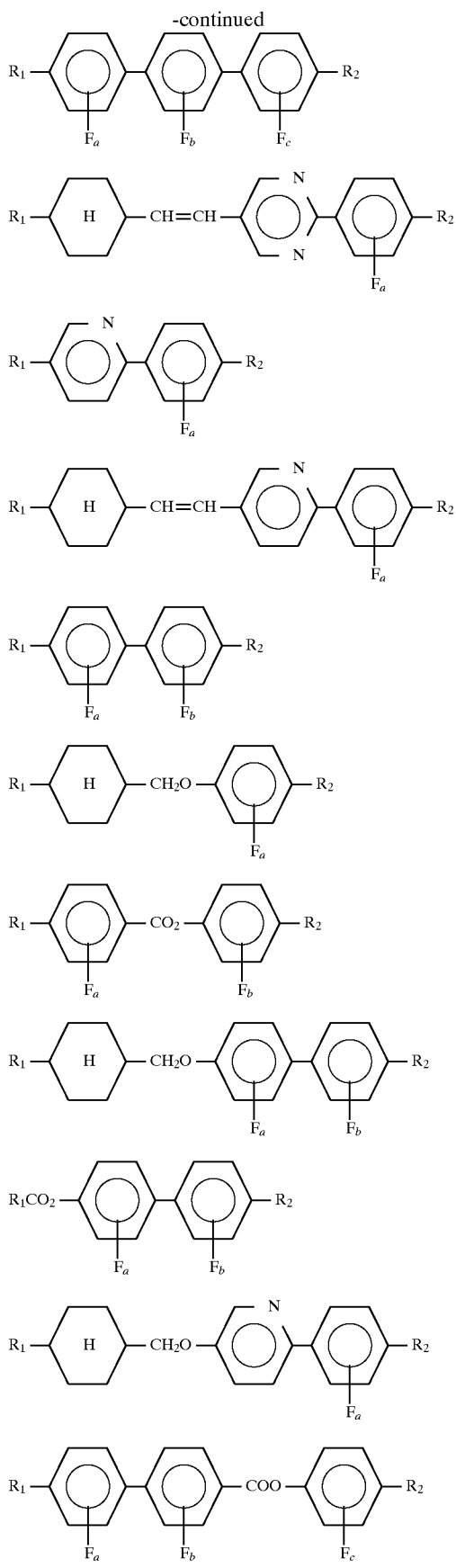

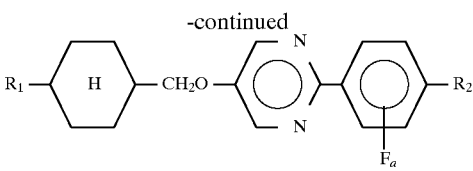

wherein a, b and c are independently 0, 1, 2; $R_1$ and $R_2$ are $C_{1-15}$ straight or branched chain alkyl or alkoxy, preferably $C_3$–$C_{12}$. In the above (for Component B) CH=CH linking groups may be replaced by $C_2H_4$ and $CH_2O$ linking groups may be replaced by $OCH_2$.

provided that when A is:

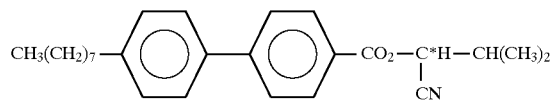

then component B may not be a combination of

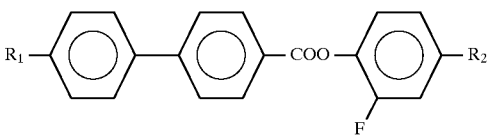

plus

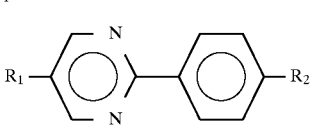

and provided that when A is a combination of:

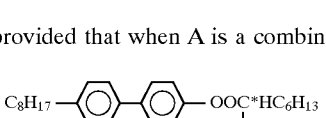

plus

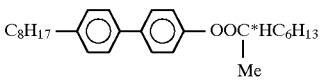

then component B may not be

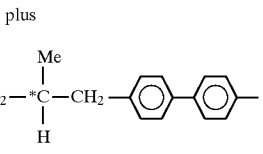

Preferably Component A is present in the range 1–15 wt %, even more preferably 1–5 wt %. Preferably any one compound constituting Component B is present in the range 5–60 wt %, even more preferably 10–30%.

Preferably the material contains optically active dopants of the formula below as described in PCT/GB88/01111;

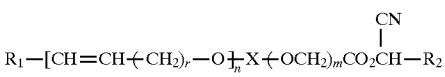

including wherein $R_1$ is selected from hydrogen, $C_{1-12}$ alkyl, alkoxy, perfluoroalkyl and perfluoroalkoxy and may be straight chain or branched chain; $R_2$ is alkyl, which may be $C_{1-8}$ straight chain, $C_{1-15}$ branched chain or cyclic, r is an integer 1–10, n and m are independently 0 or 1; X is a group of general formula:

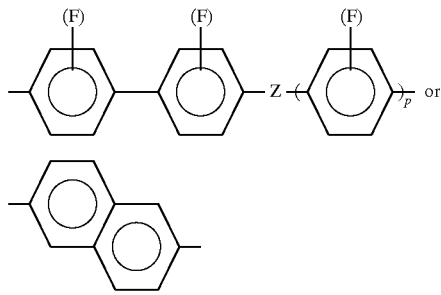

where (F) indicates that the relevant phenyl ring may carry 1 or 2 fluorine substituents, p is 0 or 1, Z is a single bond when p is 0 and COO or a single bond when p is 1.

The CN group may be substituted by $CH_3$, $CF_3$, halogen, preferably F or Cl. The $CO_2$ group may be reversed. The chiral unit $CH(CN)R_2$ may be replaced by a chiral epoxide group. One or more of the phenyl groups may be replaced by a cyclohexyl group.

Preferably the device has a $V_{min}$ less than 45 volts and/or a $t_{min}$ less than 100 μs.

Component A may be further characterised in that it may combine one or more chiral components with (–) left-handed cholesteric twist sense with one or more chiral components with (+) right-handed twist sense. None of the (–) components can be the optical enantiomers of the (+) components. This chiral mixture may be a chiral smectic itself or maybe used as an additive to a non-chiral and or racemate tilted smectic liquid crystal host material. Alternatively the chiral component or components may have the same cholesteric twist sense providing the cholesteric pitch and Ps are characterised by a tilted chiral smectic liquid crystal material having a cholesteric phase at an elevated temperature above ambient between the chiral smectic and isotropic phases with a cholesteric pitch p greater than half the layer thickness d over a temperature range of at least 0.1° C. above a cholesteric to smectic transition temperature and a significant spontaneous polarisation in the chiral smectic phase. U.S. Pat. No. 5,061,047 describes some relevant methods for making liquid crystal display devices.

The value of Ps is at least 0.1 and preferably 1 or more $nC/cm^2$.

The layer thickness may be up to 15 μm or more but is typically 1–12 μm.

BRIEF DESCRIPTION OF DRAWINGS

The invention will now be described by way of example only with reference to the accompanying drawings of which:.

Figure 1:
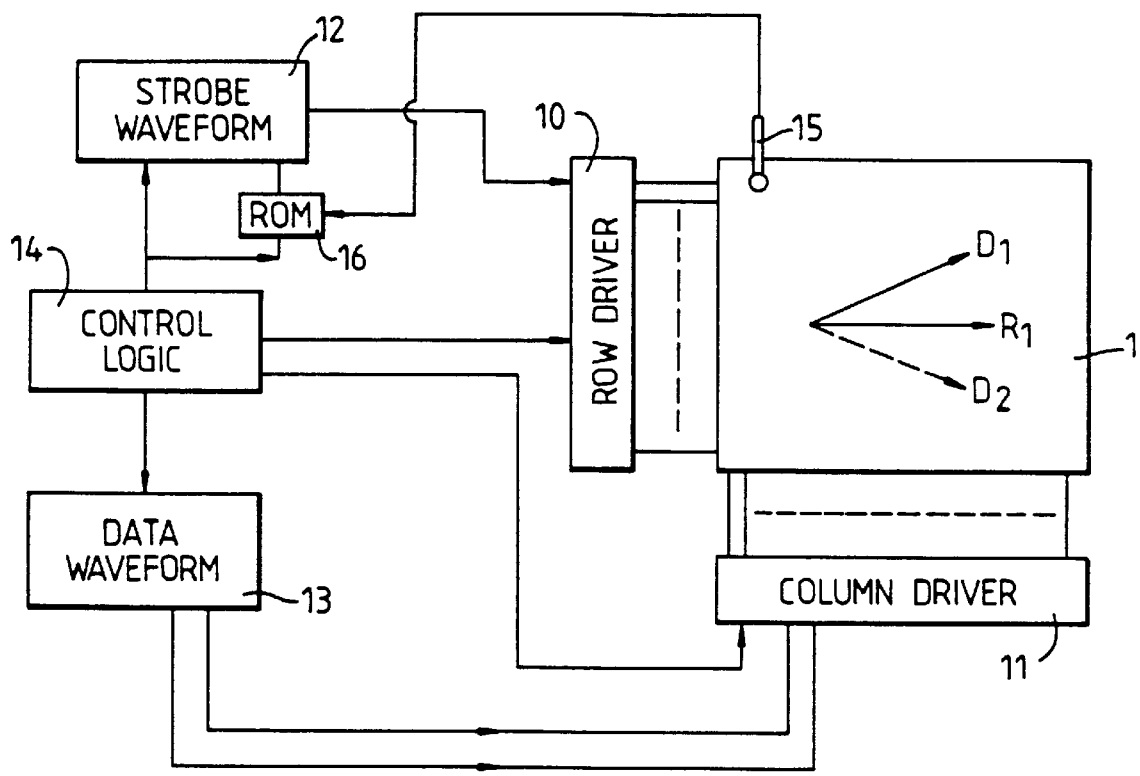
FIG. 1 is a diagrammatic view of a time multiplex addressed x, y matrix.
Figure 2:
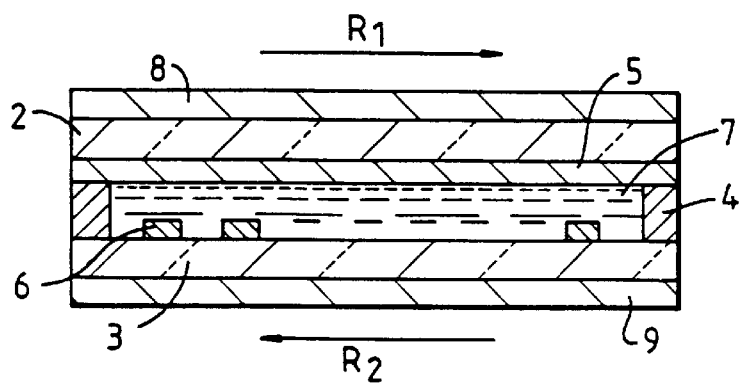
FIG. 2 is a cross section of part of the display of FIG. 1 to an enlarged scale.
Figure 3:
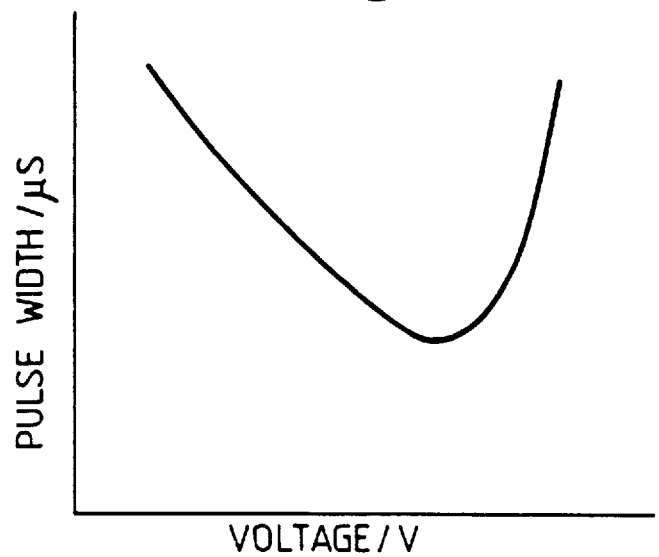
FIG. 3 is a representation of a turnaround in a ($t_{min}/V_{min}$) feature.
Figure 4:
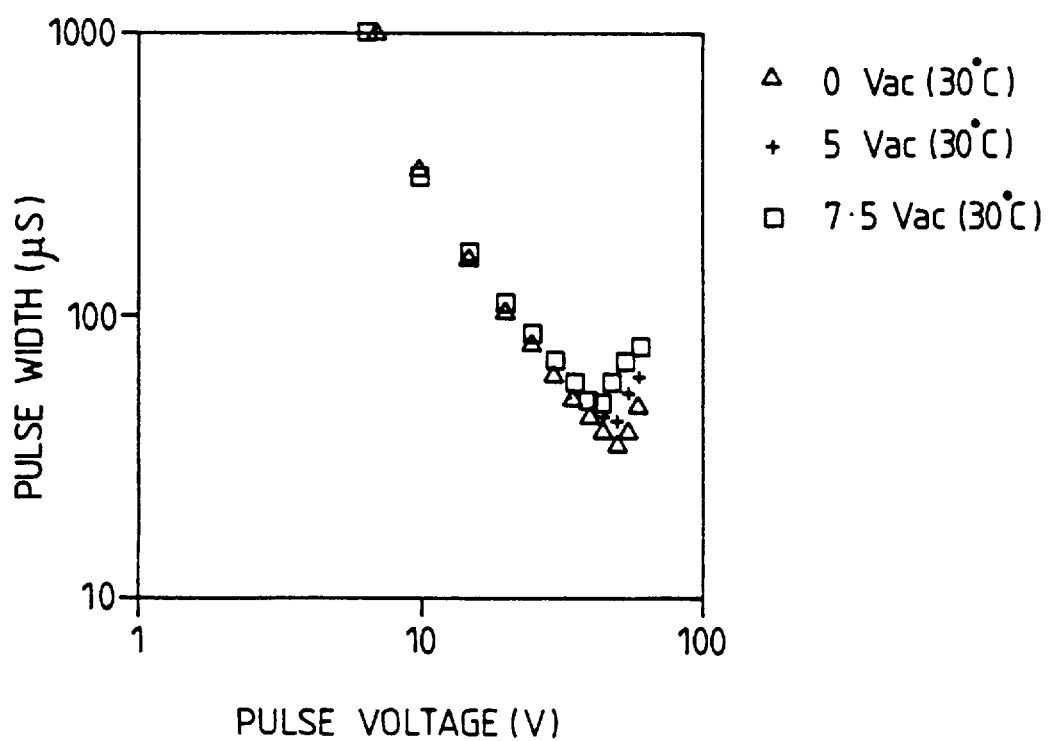
FIGS. 4–6 are graphs of t/μs versus V/V at 30° C. for mixtures 1,2 and 3 respectively, (see Table 1 for mixtures).
Figure 5:
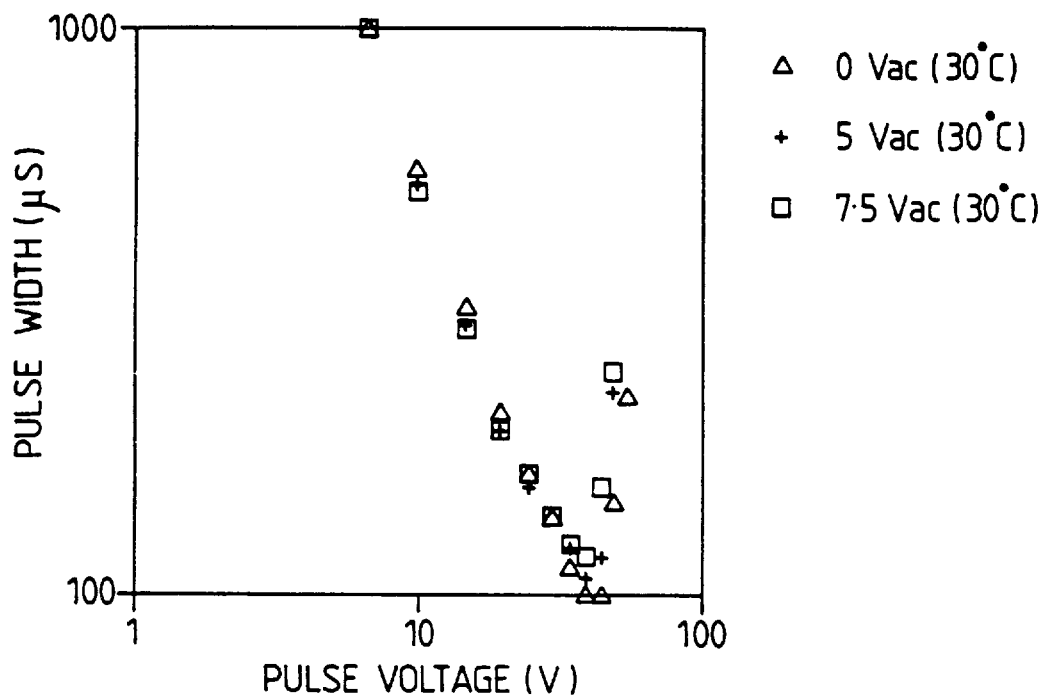
Figure 6:
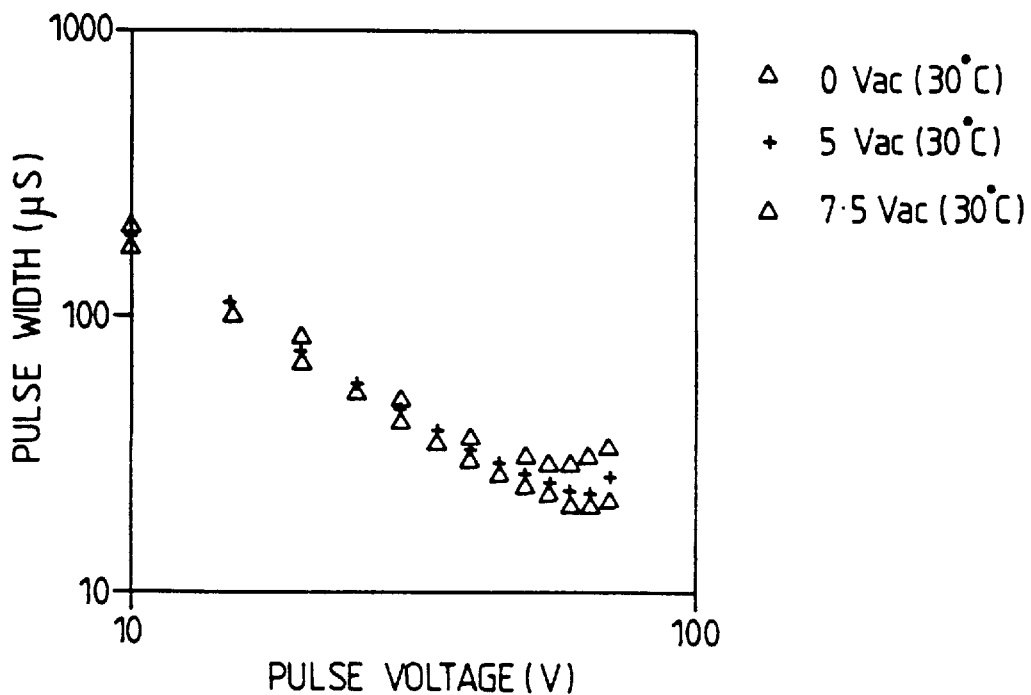

The display 1 shown in FIGS. 1, 2 comprises two glass walls 2, 3 spaced about 1–6 μm apart by a spacer ring 4 and/or distributed spacers.

Electrode structures 5, 6 of transparent tin oxide are formed on the inner face of both walls. These electrodes are shown as rows and columns forming an X, Y matrix but may be of other forms. For example, of segments formed into a digital seven bar display.

A layer 7 of liquid crystal material is contained between the walls 2, 3 and spacer ring 4.

Polarisers 8, 9 are arranged in front of and behind the cell 1. Row 10 and column 11 drivers apply voltage signals to the cell. Two sets of waveforms are generated for supplying the row and column drivers 10, 11. A strobe wave form generator 12 supplies row waveforms, and a data waveform generator 13 supplies ON and OFF waveforms to the column drivers 11. Overall control of timing and display format is controlled by a contrast logic unit 14.

Prior to assembly the walls 2, 3 are surface treated for example by spinning on a thin layer of polyamide or polyimide, drying and where appropriate curing; then buffing with a soft clean cloth (eg rayon) in a single direction R1, R2. This known treatment provides a surface alignment for liquid crystal molecules. In the absence of an applied electric field the molecules align themselves along the rubbing direction; R1 and R2 are parallel (+/–30°) in the same or opposite directions. When suitable unidirectional voltages are applied the molecular director aligns along one of two directors D1, D2 which are at an angle of about 45° to each other.

The device includes means of discriminating the states optically, eg 1 or more polarisers. It may operate in a transmissive or reflective mode. In the former, light passing through the device eg from a tungsten bulb is selectively transmitted or blocked to form the desired display. In the reflective mode a mirror is placed behind the second polariser 9 to reflect ambient light back through the cell 1 and two polarisers. By making the mirror partly reflecting the device may be operated both in a transmissive and reflective mode.

Pleochroic dyes may be added to the material 7. In this case, only one polariser is needed and the layer thickness may be 4–10 μm.

For a typical thickness of 2 μm the material at, for example, 22° C. is switched by a dc pulse of + or –50 volts for 100 μs. The two switched states D1, D2 may be arbitrarily defined as ON after receiving a positive pulse and OFF after receiving a negative pulse of sufficient magnitude. Polarisers 8, 9 are arranged with their polarisation axes perpendicular to one another and with one of the axes parallel to the director in one of the switched states.

In operation, strobe waveforms are applied to each row in turn whilst appropriate ON or OFF data waveforms are applied to each column electrode. This provides a desired display pattern formed by some x, y intersection in an ON state and another in an OFF state. Such addressing is termed multiplex addressing.

The following compounds and mixtures are examples illustrative of the invention.

|   | R | R' | % |
|---|---|---|---|
| A: $C_8H_{17}O$—⟨ ⟩—⟨ ⟩—$CO_2C^*H(CN)CH(CH_3)_2$ | | | |
| $B_1$: R—⟨ ⟩—⟨ ⟩—$CO_2$—⟨ ⟩(F)—R' | $C_8H_{17}$ | $C_5H_{11}$ | 33.3 |
| | $C_8H_{17}O$ | $C_5H_{11}$ | 33.3 |
| | $C_7H_{15}O$ | $C_7H_{15}$ | 33.3 |
| $B_2$: RO—⟨N,N⟩—⟨ ⟩—R' | $C_7H_{15}$ | $C_9H_{19}$ | 33.3 |
| | $C_9H_{19}$ | $C_9H_{19}$ | 66.6 |
| $B_3$: RO—⟨ ⟩—⟨ ⟩(F)—⟨ ⟩—R' | $C_6H_{13}$ | $C_5H_{11}$ | 22.0 |
| | $C_4H_9$ | $C_5H_{11}$ | 32.5 |
| | $C_8H_{17}$ | $C_5H_{11}$ | 29.5 |
| | $C_{10}H_{21}$ | $C_5H_{11}$ | 16.0 |
| $B_4$: $C_8H_{17}O$—⟨ ⟩—$CO_2$—⟨ ⟩(F)—$C_5H_{11}$ | | | |

TABLE 1

Mixtures containing compound $B_1$

| | Mixtures | | |
|---|---|---|---|
| | 1<br>1% A in<br>$B_1/B_2$:1/1 | 2<br>1% A in<br>$B_1$:40%<br>$B_3$:40%<br>$B_4$:20% | 3<br>2.5% A in<br>$B_1$:77.5%<br>$B_4$:20% |
| $T_{A-C}/°C$ | 66.5 | 65.5 | 77.5 |
| $\theta/°$ at 30° C. | 17 | 17 | 21 |
| $Ps/\times 10^{-5}$ $Cm^{-2}$ at 30° C. | 3.2 | 2.2 | 9.9 |
| $E_{min}/Ps$ $0V_{ac}$ | ($V_{min}$ = 50V)<br>$6.8 \times 10^{11}$ | ($V_{min}$ = 42.5V)<br>$10.2 \times 10^{11}$ | ($V_{min}$ = 62.5V)<br>$3.8 \times 10^{11}$ |
| $t_{min} \times Ps^2$ $0V_{ac}$ | ($t_{min}$ = 36 $\mu s$)<br>$3.7 \times 10^{-14}$ | ($t_{min}$ = 100 $\mu s$)<br>$4.8 \times 10^{-14}$ | ($t_{min}$ = 21 $\mu s$)<br>$20.6 \times 10^{-14}$ |
| $E_{min}/Ps$ $7.5V_{ac}$ | ($V_{min}$ = 45V)<br>$6.1 \times 10^{11}$ | ($V_{min}$ = 40V)<br>$9.6 \times 10^{11}$ | ($V_{min}$ = 67.5V)<br>$4.1 \times 10^{11}$ |
| $t_{min} \times Ps^2$ $7.5V_{ac}$ | ($t_{min}$ = 50 $\mu s$)<br>$5.1 \times 10^{-14}$ | ($t_{min}$ = 117 $\mu s$)<br>$5.7 \times 10^{-14}$ | ($t_{min}$ = 29 $\mu s$)<br>$28.4 \times 10^{-14}$ |

$T_{A-C}$ = Smectic A–Smectic C phase transition temperature.
$\theta^{A-C}$ = Cone Angle.
Ps = Spontaneous Polarisation.
E = Electric field.
cell thickness (d/$\mu$m) for the three different mixtures 1.2 and 3 is 2.3, 1.9 and 1.65 respectively.

When analysing the data presented in Table 1 it is perhaps most instructive to consider the column headed $E_{min}$/Ps and $t_{min} \times PS^2$.

Tables 2 and 3 list Ps and $\theta$ data at different temperatures for Mixtures 1 and 2.

TABLE 2

Mixture 1

| Temp/°C. | Ps/nCcm$^{-2}$ | Cone Angle/° |
|---|---|---|
| 65 | | 1.3 |
| 60 | 1.39 | 9.0 |
| 50 | 2.13 | 13.0 |
| 40 | 2.66 | 15.0 |
| 30 | 3.15 | 16.5 |
| 20 | 3.60 | |

TABLE 3

Mixture 2

| Temp/°C. | Ps/nCcm$^{-2}$ | Cone Angle/° |
|---|---|---|
| 65 | 0.10 | 2.3 |
| 60 | 0.83 | 9.8 |
| 50 | 1.46 | 13.1 |
| 40 | 1.93 | 14.9 |
| 30 | 2.16 | 17.3 |
| 20 | 2.26 | 18.1 |

Various mixtures are assessed below, at 30° C. unless otherwise stated. Units $V_{min}$ are V, units for $t_{min}$ are $\mu$s, units for Ps are nCcm$^{-2}$:

ZLI 5014-000 is a commercially available mixture from Merck.

$$V_{min}=60 t_{min}=26 Ps=2.7 nCcm^{-2}$$

LB7 is a 1:1 mixture of the following:

2 parts 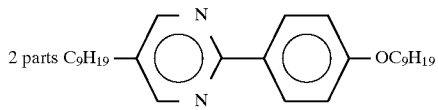

1 part 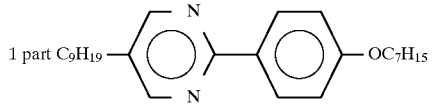

this mixture is then mixed with one part of the following:

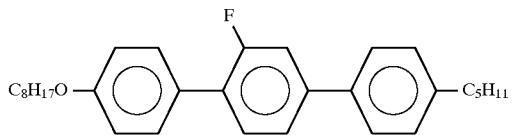

plus 5% of BE8OF2N (1% active).

$V_{min}=46 t_{min}=29$ Ps$=1.9$ nCcm$^{-2}$

AJS20 is a mixture of the following:

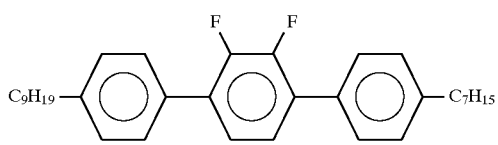 3.5

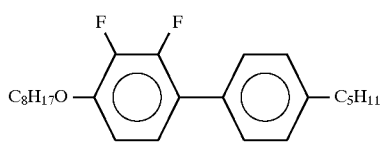 2.9

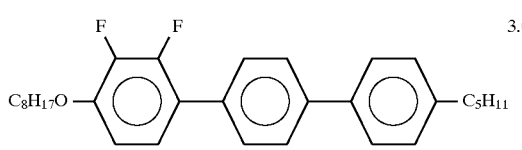 3.0

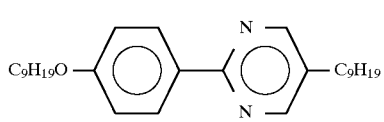 3.1 plus 5% of BE8OF2N (1.75% active).

$V_{min}=21.4 t_{min}=38$ Ps$=2.3$ nCcm$^{-2}$.

AJS62 is a mixture of the following:

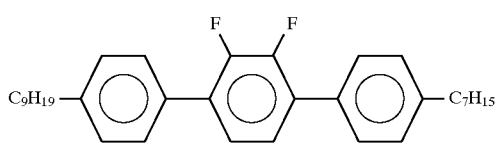 3.2

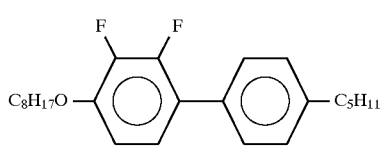 2.7

-continued

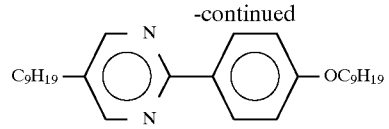 2.7

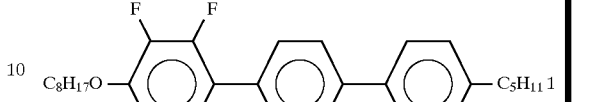 1.0

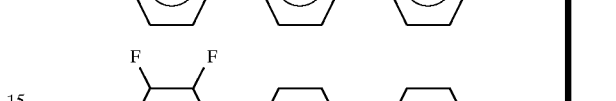 1

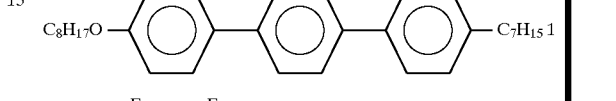 1

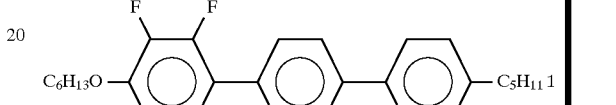 1 plus 5.1% of BE8OF2N (1.8% active).

$V_{min}=70 t_{min}=19.6$

AJS64 is a mixture of the following:

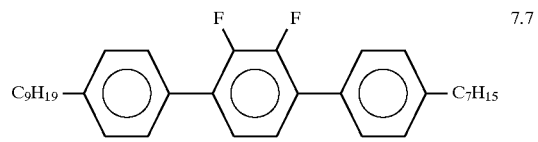 7.7

 7.7

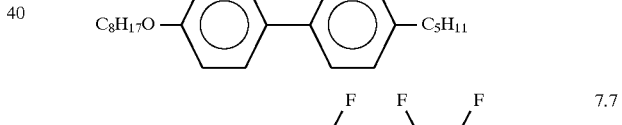 7.7

 7.8 plus 5.2% of BE8OF2N (2.3%. active).

$V_{min}=55 t_{min}=19.6$

AJS67 is a mixture of the following:

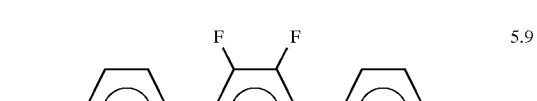 5.9

-continued
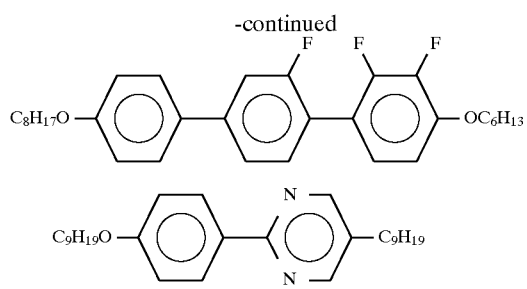
plus 5% of BE8OF2N (2.25% active).
$V_{min}=6.5 t_{min}=19 Ps=6.9 nCcm^{-2}$.
(7.5 Vac bias)
AJS32 is a mixture of the following:
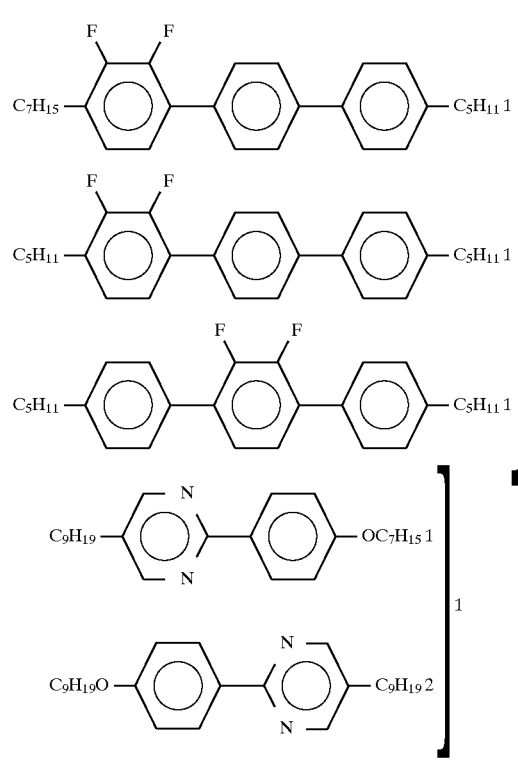
plus 1.75% of BE8OF2N
$V_{min}=46 t_{min}=15 Ps=4.2\ nCcm^{-2}$.
VH53 is a mixture of the following:
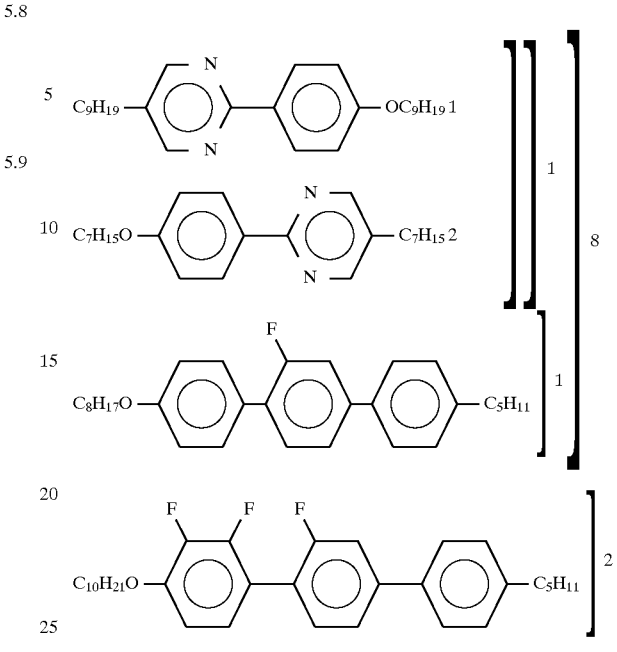
plus 5% of BE8OF2N (1% active)
$V_{min}=44 t_{min}=61 Ps=2.5\ nCcm^{-2}$.
LPM68 is a mixture of the following:
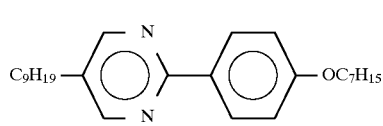
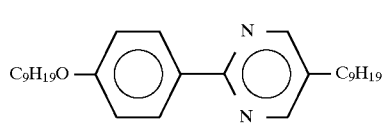
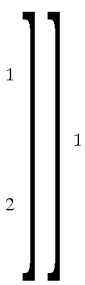

-continued

C$_8$H$_{17}$O—⬡—⬡—CO$_2$—⬡—C$_5$H$_{11}$  1
                                    |
                                    F

C$_8$H$_{17}$—⬡—⬡—CO$_2$—⬡—C$_5$H$_{11}$  1   ⎫
                              |              ⎬ 1
                              F

C$_7$H$_{15}$O—⬡—⬡—CO$_2$—⬡—C$_7$H$_{15}$  1  ⎭
                                    |
                                    F plus 1% of IGS97

$V_{min}=50 t_{min}=36 Ps=3.0$ nCcm$^{-2}$.

13/291-1 is a mixture of the following:

C$_5$H$_{11}$—⬡—OCH$_2$—⬡—⬡—OC$_{10}$H$_{21}$  1
                       F F

C$_5$H$_{11}$—⬡—OCH$_2$—⬡—⬡—OC$_8$H$_{17}$  1 +
                       F F 2.5% C$_9$H$_{19}$O—⬡—⬡—CO$_2$CHCH$_3$
                                  |
                                  CN $V_{min}=40 t_{min}=33$ Ps$=6.4$ nCcm$^{-2}$. (36° C.)

031291-1 is a mixture of the following:

C$_7$H$_{15}$—⬡—C$_2$H$_4$—⬡—⬡—OC$_8$H$_{17}$  2
                          F F

C$_3$H$_7$—⬡—C$_2$H$_4$—⬡—⬡—OC$_{10}$H$_{21}$  1 +
                       F F

5% C$_8$H$_{17}$O—⬡—⬡—CO$_2$CHCH$_3$
              |                    |
              F                    CN $V_{min}=38 t_{min}=35 Ps=6.5$ nCcm$^{-2}$. (25° C.)

H1 is a mixture of the following:

C$_8$H$_{17}$O—⬡—⬡—CO$_2$—⬡—C$_5$H$_{11}$  1
                                    |
                                    F

C$_8$H$_{17}$—⬡—⬡—CO$_2$—⬡—C$_5$H$_{11}$  1
                              |
                              F

C$_7$H$_{15}$O—⬡—⬡—CO$_2$—⬡—C$_7$H$_{15}$  1
                                    |
                                    F plus 1.75% of BE8OF2N $V_{min}=35 t_{min}=90 Ps=9.0$ nCcm$^{-2}$.

VH50 is a mixture of the following:

C$_7$H$_{15}$O—⬡—⬡—CO$_2$—⬡—C$_7$H$_{15}$  1
         |                    |
         F                    F

C$_8$H$_{17}$—⬡—⬡—CO$_2$—⬡—C$_5$H$_{11}$  1
       |                   |
       F                   F

C$_8$H$_{17}$O—⬡—⬡—CO$_2$—⬡—C$_7$H$_{15}$  1
         |                    |
         F                    F plus 10% of BE8OF2N (1.71% active)

$V_{min}=35 t_{min}=163 Ps=7.4$ nCcm$^{-2}$.

VF9 is a mixture of the following:

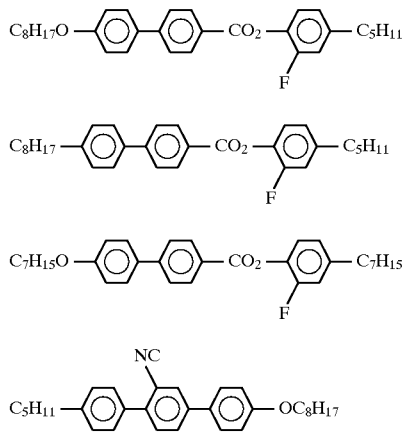

plus 2% of BE8OF2N $V_{min}=61 t_{min}=41 Ps=9.2$ nCcm$^{-2}$.

BDH 835 is a commercially available mixture from Merck $V_{min}=45 t_{min}=33 Ps=9.5$ nCcm$^{-2}$.

SCE8 is a commercially available mixture from Merck $V_{min}=50 t_{min}=46 Ps=5.7$ nCcm$^{-2}$ (25° C.).

LT4 is a mixture of the following:

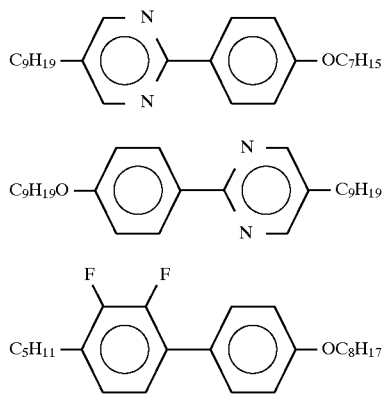

plus 2% of BE8OF2N $V_{min}=52 t_{min}=26 Ps=6.6$ nCcm$^{-2}$ (9° C.)

VH51 is a mixture of the following:

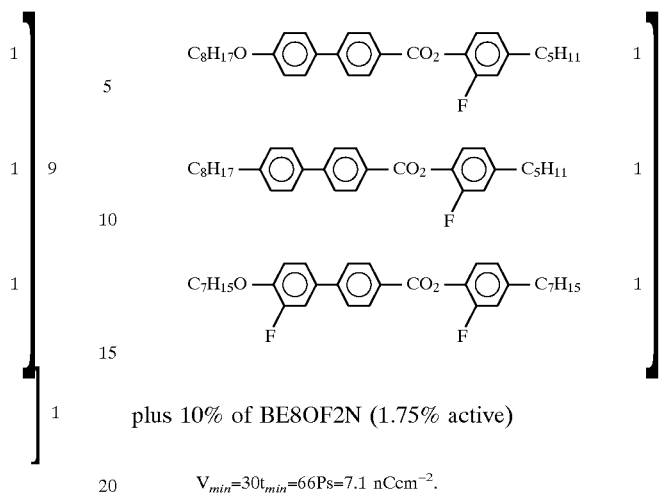

plus 10% of BE8OF2N (1.75% active)

$V_{min}=30 t_{min}=66 Ps=7.1$ nCcm$^{-2}$.

VH52 is a mixture of the following:

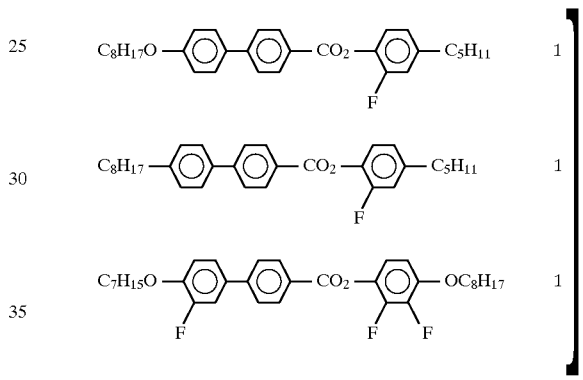

plus 10% of BE8OF2N (1.7% active)

$V_{min}=35 t_{min}=121 Ps=5.7$ nCcm$^{-2}$.

AS452 is a mixture of the following:

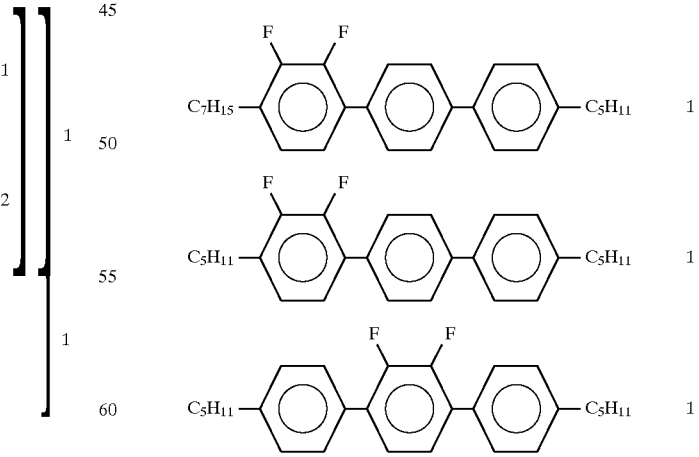

plus 1.75% of BE8OF2N $V_{min}=41 t_{min}=13$

AS407 is a mixture of the following:

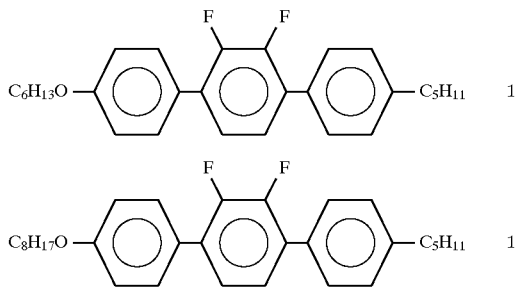

plus 2.5% of IGS97

$V_{min}=50 t_{min}=29 Ps=7.74\ nCcm^{-2}$

AS436 is a mixture of the following:

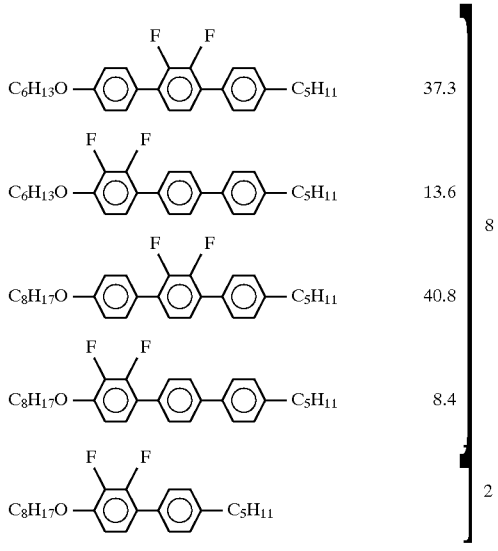

plus 2.5% of IGS97

$V_{min}=50 t_{min}=17 Ps=6.6\ nCcm^{-2}$

AS435 is the same as AS436 except that there is 1.28% of IGS97 present.

$V_{min}=45 t_{min}=31 Ps=2.7\ nCcm^{-2}$ wherein:
IGS97 is:

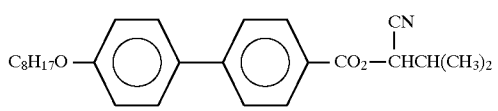

BE8OF2N

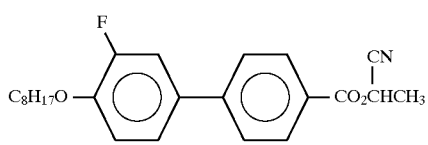

We claim:
1. A ferroelectric liquid crystal device comprising two spaced cell walls each bearing electrode structures and treated on at least one facing surface with an alignment layer, a layer of a smectic liquid crystal material enclosed between the cell walls, a minimum in its response time versus voltage curve, wherein the liquid crystal material consists essentially of two components: A and B, where the two components are given by:

Component A is present in the range of 0.1–50 wt % and is one or more optically active compounds having the formula:

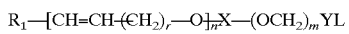

wherein $R_1$ is selected from hydrogen, $C_{1-12}$ alkyl, alkoxy, perfluoroalkyl and perfluoroalkoxy and may be straight chain or branched chain; r is an integer 1–10, n and m are independently 0 or 1; X is a group of the formula:

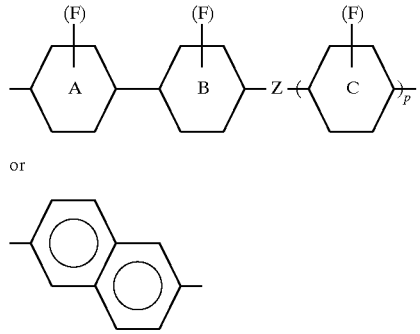

or

A, B and C are independently phenyl or cyclohexyl; (F) indicates that the ring may carry 1 or 2 fluorine substituents; p is 0 or 1; Z is a single bond when p is 0 and COO or OOC or a single bond when p is 1; Y is $CO_2$ or $O_2C$; L is a chiral epoxide or is given by the formula:

J is CN, F, Cl, $CH_3$ or $CF_3$; $R_2$ is alkyl, which may be $C_{1-8}$ straight chain, $C_{1-15}$ branched chain or cyclohexyl;

Component B is present in the range sufficient to enable A+B=100 wt %, and is at least two compounds selected from:

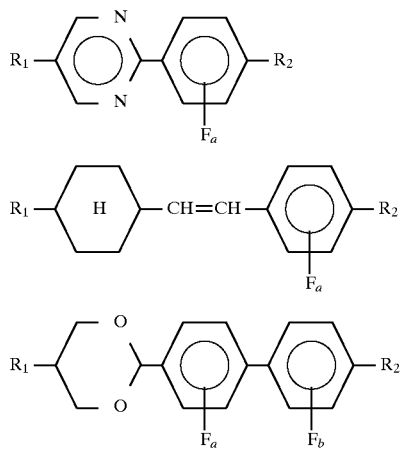

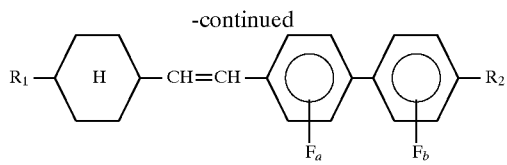

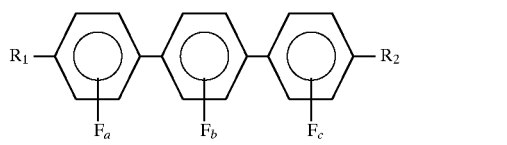

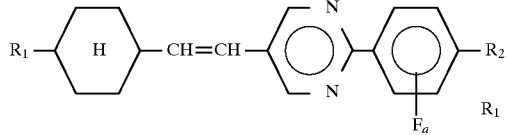

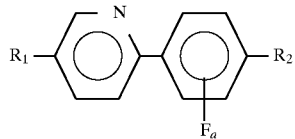

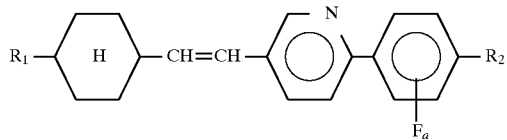

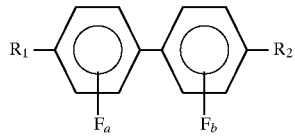

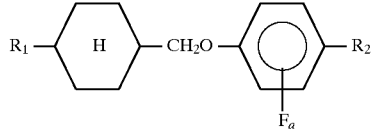

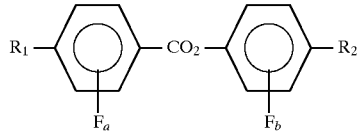

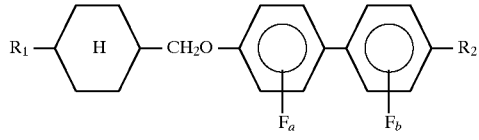

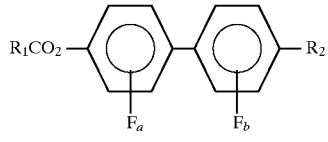

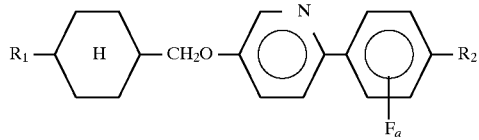

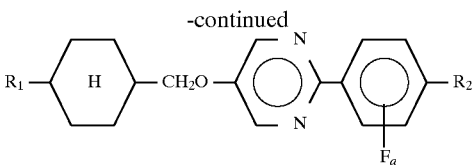

wherein a, b and c are independently 0, 1 or 2: $R_1$ and $R_2$ are $C_{1-15}$ straight or branched chain alkyl or alkoxy, preferably $C_3$-$C_{12}$, and in the above, for Component B, CH=CH linking groups may be replaced by $C_2H_4$ and $CH_2O$ linking groups may be replaced by $OCH_2$.

2. A device according to claim 1 wherein one of the compounds constituting component B consists of one or more compounds selected from:

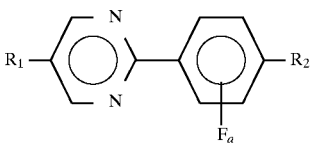

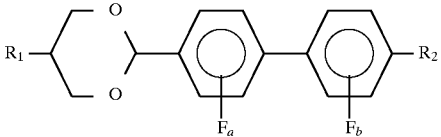

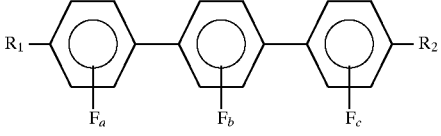

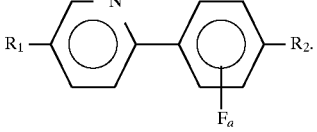

3. A device according to claim 1 wherein component A is given by the following formula:

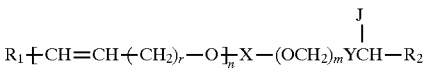

wherein $R_1$ is selected from hydrogen, $R_{1-12}$ alkyl, alkoxy, perfluoroalkyl and perfluoroalkoxy and may be straight chain or branched chain; $R_2$ is alkyl, which may be $C_{1-8}$ straight chain, $C_{1-15}$ branched chain or cyclohexyl, r is an integer 1–10, n and m are independently 0 or 1; Y may be $CO_2$ or $O_2C$; J may be CN, F, Cl, $CH_3$ or $CF_3$; X is a group of general formula:

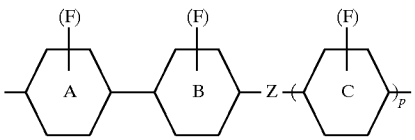

and

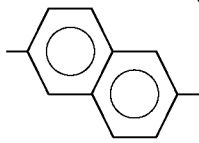

A, B and C may be independently phenyl or cyclohexyl; (F) indicates that the ring may carry 1 or 2 fluorine substituents; p is 0 or 1; Z is a single bond when p is 0 and COO or a single bond when p is 1.

4. A device according to claim 3 wherein J is CN and Y is $CO_2$.

5. A device according to claim 4 wherein A, B and C are phenyl rings.

6. A device according to claim 1 wherein component A is given by the following formula:

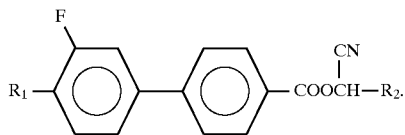

7. A device according to claim 1 wherein component A is given by one of the following formulae:

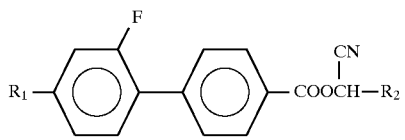

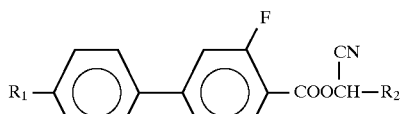

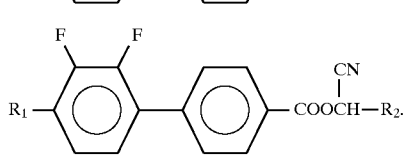

8. A device according to claim 1 wherein component A is given by the following general formula:

where n is 0 or 1; r is 1–6; $R_1$ is $C_{1-12}$ alkyl or alkoxy and $R_2$ is a branched chain alkyl.

9. A device according to claim 9 wherein $R_2$ is isopropyl.

10. A device according to claim 9 wherein one of the compounds constituting component B is of the following formula:

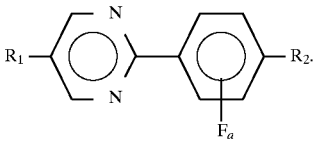

11. A device according to claim 9 wherein one of the compounds constituting component B is of the following formula:

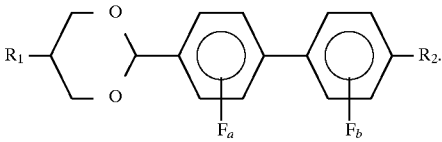

12. A device according to claim 9 wherein one of the compounds constituting component B is of the following formula:

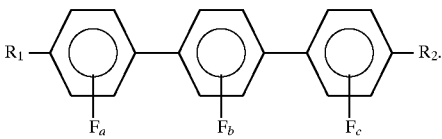

13. A device according to claim 9 wherein one of the compounds constituting component B is of the following formula:

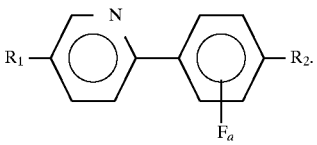

14. A device according to claim 9 wherein one or more of the compounds constituting component A is present in the range 1–15 wt %.

15. A device according to claim 2 wherein one or more of the compounds constituting component A is present in the range 1–15 wt %.

16. A device according to claim 9 wherein one or more of the compounds constituting component B is present in the range 5–60 wt %.

17. A device according to claims 2 wherein one or more of the compounds constituting component A is present in the range 10–30 wt %.

18. A device according to claim 9 wherein the ferroelectric liquid crystal device is multiplex addressed.

19. A device according to claim 2 wherein the ferroelectric liquid crystal device is multiplex addressed.

20. A device according to claim 1 wherein component A when added to component B gives rise to a tilted chiral smectic liquid crystal material having a cholesteric pitch which is greater than half the layer thickness d over a temperature range of at least 0.1° C. above a cholesteric to smectic transition temperature and a spontaneous polarisation Ps in the chiral smectic phase.

21. A device according to claim 20 wherein component A comprises (+) and (−) chiral materials such that the resultant mixture has a spontaneous polarisation in the chiral tilted smectic phases.

* * * * *